Figure 1:
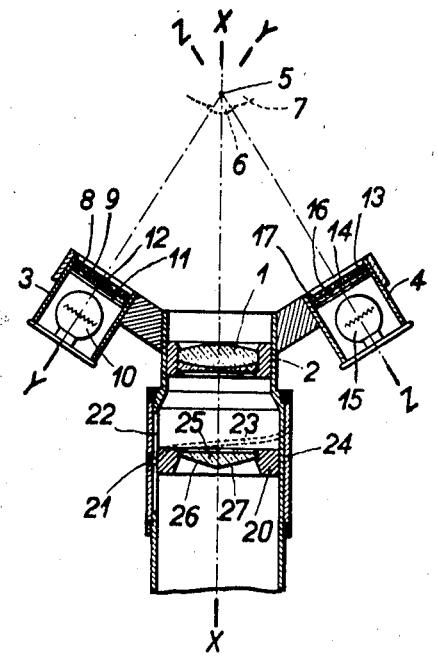

Sept. 5, 1939.   H. HARTINGER   2,171,627
OPHTHALMOMETER
Filed Jan. 11, 1937

Inventor:
Hans Hartinger

Patented Sept. 5, 1939

2,171,627

UNITED STATES PATENT OFFICE 2,171,627

OPHTHALMOMETER

Hans Hartinger, Jena, Germany, assignor to the firm Carl Zeiss, Jena, Germany

Application January 11, 1937, Serial No. 119,970 In Germany January 27, 1936

3 Claims. (Cl. 88—20)

An application has been filed in Germany, January 27, 1936.

The invention concerns an optical system which to be used with ophthalmometers, i. e., instruments for determining the curvature of the cornea, and which has two test marks coordinated the cornea and a device for producing a double image of each of the two test-mark images reflected by the cornea and for adjusting these two double images relatively to each other.

For the reciprocal adjustment of the two double images solely the two interior of all four images are required, the two exterior images only disturbing the measurement.

The invention provides linearly polarizing means for making the said two exterior images disappear. These means are to produce an image of each test-mark through the agency of polarized light. It is advantageous to use to this effect two foils, for instance of herapathite, which polarize the light linearly and each of which is coordinated to one of the two test marks and which are so disposed that their planes of oscillation are at right angles to each other.

In ophthalmometers in which the reflected images of the two test-marks are doubled by a system of glass wedges (for instance by double glass wedges which are rotatable relatively to each other for the reciprocal adjustment of the two double images, or by a bi-prism effecting this reciprocal adjustment by displacement), the disappearance of the two exterior images is to be effected by using in addition two analyzers which are coordinated to the system of glass wedges and each of which is disposed in one of the two ray paths producing the double images of the two test-marks. It is advantageous to use also in this case two linearly polarizing foils the planes of oscillation of which are at right angles to each other.

In ophthalmometers in which the reflected images of the two test-marks are doubled by a system of glass wedges, there can be used for effecting the disappearance of the two exterior of the four images due to doubling of images, instead of linearly polarizing means, a ray-filtering device which has two differently colored ray filters, each of these filters being coordinated to one of the two test-marks, so that the test-mark images reflected by the cornea are differently colored, and which has two ray filters coordinated to the system of glass wedges, these filters being differently colored in such a manner that the colors of the two interior of the four images of the two double images correspond to the colors of the said two reflected images, and the two exterior of the four images being invisible to the observer's eye.

The invention naturally also applies to ophthalmometers which have more than one pair of test-marks cooperating with each other.

The accompanying drawing, which illustrates the invention, represents in section through the optical axes of the respective objectives two constructional examples of an ophthalmometer. For the sake of simplicity, there are omitted in the drawing those well-known parts of the ophthalmometer which are not necessary for illustrating the invention, these omitted parts being the base supporting the observing device, the eye-piece of the observing device, the device which is coupled to the device for reciprocally displacing the produced double images, and indicating the curvature to be measured, and the bright mark which is disposed in the observing device and to be viewed by the eye under examination. The devices for doubling the test-mark images reflected by the cornea and for reciprocally adjusting the two double images are different in both examples, the example according to Figure 1 having to this effect a bi-prism displaceable along the optical axis of the objective, and the example according to Figure 2 having a pair of rotatable Herschel glass wedges. Figure 3 shows the two double images, which are produced in the field of view of the observing device, in the position in which the two interior halves of the double images touch each other.

In Figure 1, the optical observing device has an objective 1 fixed into a tubular housing 2 which is assumed to be rotatable about the axis X—X of the said objective. To the housing 2 are fixed two tubular bodies 3 and 4 whose axes Y—Y and Z—Z, respectively, intersect each other at a point 5 corresponding approximately to the position which the centre of curvature of the cornea 6 of an eye 7 to be examined assumes relatively to the instrument. Into the tubular body 3 is fixed a glass plate 8 bearing a test mark 9 illuminated by a source of light 10. Between the glass plate 8 and another glass plate 11 is cemented a herapathite foil 12 which linearly polarizes the light emitted by the source of light 10 and whose plane of oscillation is at right angles to the plane of the drawing. Into the tubular body 4 is fixed a glass plate 13 bearing a test mark 14 illuminated by a source of light 15. Between the glass plate 13 and another glass plate 16 is cemented a herapathite foil 17 which linearly polarizes the light emitted by the source of light 15 and whose plane of oscillation coincides with the plane of the drawing. The two images due to reflection of the two test marks 9 and 14 on the cornea 6 are doubled by a bi-prism 25, which is so mounted in the tube 2 as to be displaceable along the axis X—X. The mount 20 of the bi-prism has a pin 21 extending through a longitudinal aperture 22 of the tube 2 and engaging in a helical groove 23 of a sleeve 24, which is rotatable relatively to the tube 2. Displacements of the bi-prism 25 along the axis X—X are effected by rotating the sleeve 24 relatively to the tube 2. To ensure the disappearance of the exterior halves of the two double images produced by the bi-prism 25, there are cemented to the two inclined surfaces of the bi-prism linearly polarizing herapathite foils 26 and 27, respectively, the plane of oscillation of the foil 26 lying in, and that of the foil 27 being at right angles to, the plane of the drawing. The device which is to indicate the curvature of the cornea, and is omitted in the drawing, contains an index fixed to the sleeve 24 and a scale provided on the housing 2.

When using the instrument, the observer seeing in the (omitted) eye-piece of the observing device the interior halves of the two double images, which the bi-prism 25 produces of the reflected test-mark images, is to displace the bi-prism by rotating the sleeve 24 until the said double images of the test-mark images coincide with each other. When this coincidence is effected, the said (omitted) indicating device shows the sought curvature of the cornea.

Fig. 3 represents the double images $a^1$, $a^2$ and $b^1$, $b^2$, which the bi-prism produces of the reflected image of the test-mark 9 and the reflected image of the test-mark 14. In other words, $a^1$, $b^2$ is the one, and $a^2$, $b^1$ the other double image of the two test-mark images reflected by the cornea. The drawing shows these two double images $a^1$, $b^2$ and $a^2$, $b^1$ in those reciprocal positions which these images are to assume for the measurement, and in which the two interior halves $a^1$ and $b^1$ of the two double images $a^1$, $b^2$ and $a^2$, $b^1$ are in contact with each other. The two double images $a^1$, $b^2$ and $a^2$, $b^1$ appear in the image plane of the opthalmometer eye-piece, which is not shown in the drawing. The two exterior halves $a^2$ and $b^2$ of the two double images $a^1$, $b^2$ and $a^2$, $b^1$ are hatched in the drawing. These exterior halves are not visible to the observer, which is due to the reciprocal positions assumed by the foils 12, 17 and 26, 27.

Figure 2:
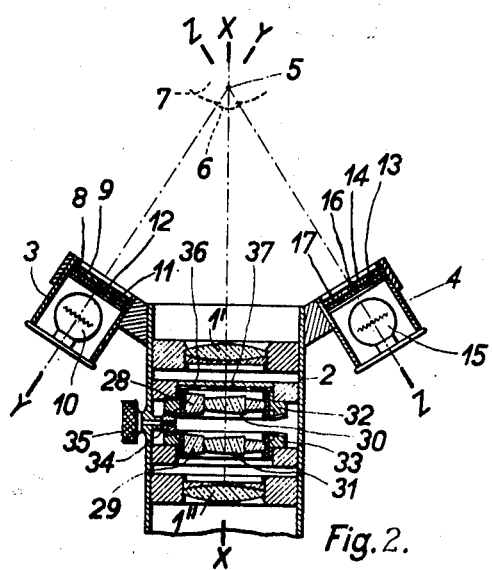
Figure 3:
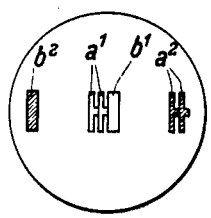

The optical system illustrated by Figure 2 differs from that according to Figure 1 only in that its device for doubling the reflected images has a system of rotatable glass wedges, which is disposed in the path of parallel rays between the two members 1' and 1'' of an objective. The system of glass wedges comprises two annular glass wedges 28 and 29 surrounding central glass wedges 30 and 31, respectively, which deviate the rays in a direction reverse to the deviation effected by the corresponding annular glass wedges. The two annular glass wedges 28 and 29 are so mounted in the tube 2 as to be rotatable about the axis X—X by means of two bevel wheels 32 and 33, a bevel wheel 34 and a milled head 35. Rotating the milled head 35 entails equal rotations of the two systems of glass wedges 28, 30 and 29, 31 in the reverse sense and, accordingly, a reciprocal adjustment of the two double images $a^1$, $b^2$ and $a^2$, $b^1$. The device for indicating the curvature of the cornea, which is omitted in the drawing, has a scale on the housing 2 and an index connected to to milled head 35. To make the two exterior halves $a^2$ and $b^2$ of the two double images $a^1$, $b^2$ and $a^2$, $b^1$ disappear, they are fixed in the tube 2, near the object sides of the glass wedges 28 and 30, an annular herapathite foil 36 and a central herapathite foil 37 respectively, both of which are polarizing linearly, the plane of oscillation of the foil 36 being at right angles to, and that of the foil 37 coinciding with, the plane of the drawing.

When using the instrument, the observer seeing in the (omitted) eye-piece of the observing device the interior halves $a^1$ and $b^1$ of the two double images produced by the glass wedges, is to rotate the wedges 28, 30 and 29, 31 by means of the milled head 35 until these interior halves coincide with each other. When this coincidence is effected, the said (omitted) indicating device shows the sought curvature of the cornea.

As an absorption of light can be effected not only by cooperation of two herapathite foils whose planes of oscillation are at right angles to each other, but also by cooperation of two color filter of complementary colors, the two exterior halves $a^2$ and $b^2$ of the two double images $a^1$, $b^2$ and $a^2$, $b^1$ can be made to disappear in the optical systems according to Figures 2 and 3 also by using red filters instead of the foils 12, 27 and 12 36, respectively, whose planes of oscillation are at right angles to the plane of the drawing, and blue filters instead of the foils 17, 26 and 17, 37 respectively, whose planes of oscillation are parallel to the plane of the drawing.

I claim:

1. An optical system for an instrument for determining the curvature of the cornea of an eye at a definite small distance therefrom, comprising a housing, an objective disposed in said housing and forming part of a device for the observation of the eye, two test-marks fixed on said housing and located symmetrically to the optical axis of said objective, two linearly polarizing foils, each of said foils being coordinated to one of said test-marks for polarization of the light projecting said one test-mark on the cornea, the planes of oscillation of said two foils being at right angles to each other, said objective having a focal distance enabling said objective to image in the image plane of said observation device the two test-mark images produced by the cornea, a system of glass wedges for producing in said image plane a double image of each test-mark, both double images being displaced relatively to each other in parallel to the line connecting said two test-marks, said system of glass wedges being adjustably mounted in said housing for displacement of said two double images relative to each other and parallel to said line, means for adjustment of said system of glass wedges relative to said housing, and two other linearly polarizing foils mounted in said housing rearwardly of said objective, said other foils being optically coordinated to said system of glass wedges, the planes of oscillation of said other foils being at right angles to each other, and the plane of oscillation of each of said other foils being parallel to one of the planes of oscillation of first said foils.

2. An optical system for an instrument for determining the curvature of the cornea of an eye at a definite small distance therefrom, comprising a housing, an objective disposed in said housing and forming part of a device for the observation of the eye, two test-marks fixed on said housing and located symmetrically to the optical axis of said objective, two linearly polarizing foils, each of said foils being coordinated to one of said test-marks for polarization of the light projecting said one test-mark on the cornea, the planes of oscillation of said two foils being at right angles to each other, said objective having a focal distance enabling said objective to image in the image plane of said observation device the two test-mark images produced by the cornea, a system of glass wedges consisting of two members disposed in series, each of said two members being mounted in said housing rearwardly of said objective and rotatable about an axis coinciding with the optical axis of said objective, each of said two members containing an annular glass wedge surrounding a central glass wedge, the deviation of rays by said central glass wedge being reverse to the deviation of rays by said annular glass wedge, means for rotation of said two members through the same angles in reverse senses, and two other linearly polarizing foils, said other foils being fixed to said housing rearwardly of the objective, one of said other foils being in optical alignment with the central prism element and the other with the annular prism element, the planes of oscillation of said other foils being at right angles to each other and the plane of oscillation of each of said other foils being parallel to one of the planes of oscillation of first said foils.

3. An optical system for an instrument for determining the curvature of the cornea of an eye at a definite small distance therefrom, comprising a housing, an objective disposed in said housing and forming part of a device for the observation of the eye, two test-marks fixed on said housing and located symmetrically to the optical axis of said objective, two linearly polarizing foils, each of said foils being coordinated to one of said test-marks for polarization of the light projecting said one test-mark on the cornea, the planes of oscillation of said two foils being at right angles to each other, said objective having a focal distance enabling said objective to image in the image plane of said observation device the two test-mark images produced by the cornea, a mount disposed in said housing rearwardly of said objective and adjustable along the optical axis of said objective, a bi-prism disposed in said mount, the principal section of said bi-prism being parallel to the plane containing the two test-marks and the axis of said objective, means for adjustment of said mount relative to said housing, and two other linearly polarizing foils, each of said other foils being connected to one of the two inclined surfaces of said bi-prism, the planes of oscillation of said other foils being at right angles to each other, and the plane of oscillation of each of said other foils being parallel to the plane of oscillation of one of first said foils.

HANS HARTINGER.